July 15, 1941.　　　　G. H. MOURNING ET AL　　　　2,249,026
AIRPLANE
Filed Feb. 28, 1938　　　　6 Sheets-Sheet 1

Garland H. Mourning.
Frank H. Richterkessing.
INVENTORS

BY John L. Milton
ATTORNEY

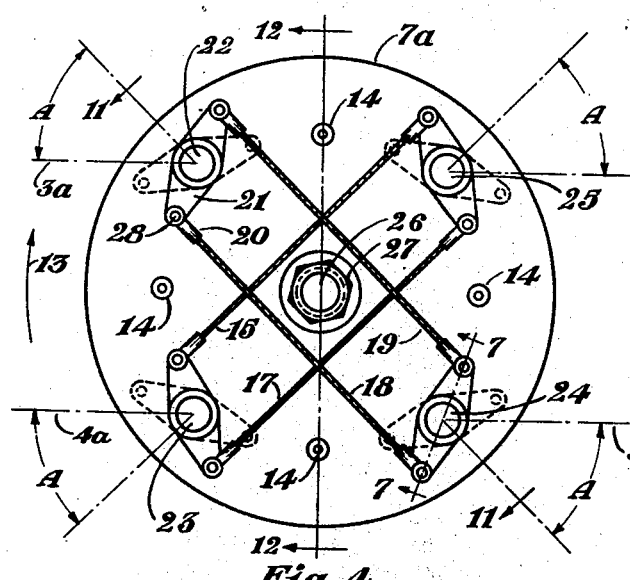

July 15, 1941.    G. H. MOURNING ET AL    2,249,026
AIRPLANE
Filed Feb. 28, 1938    6 Sheets-Sheet 3
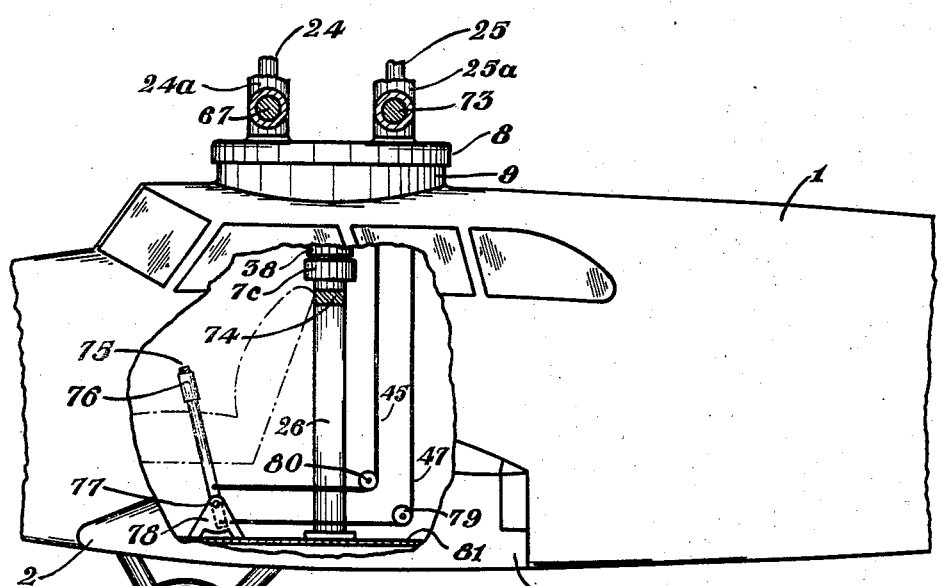
Fig.10
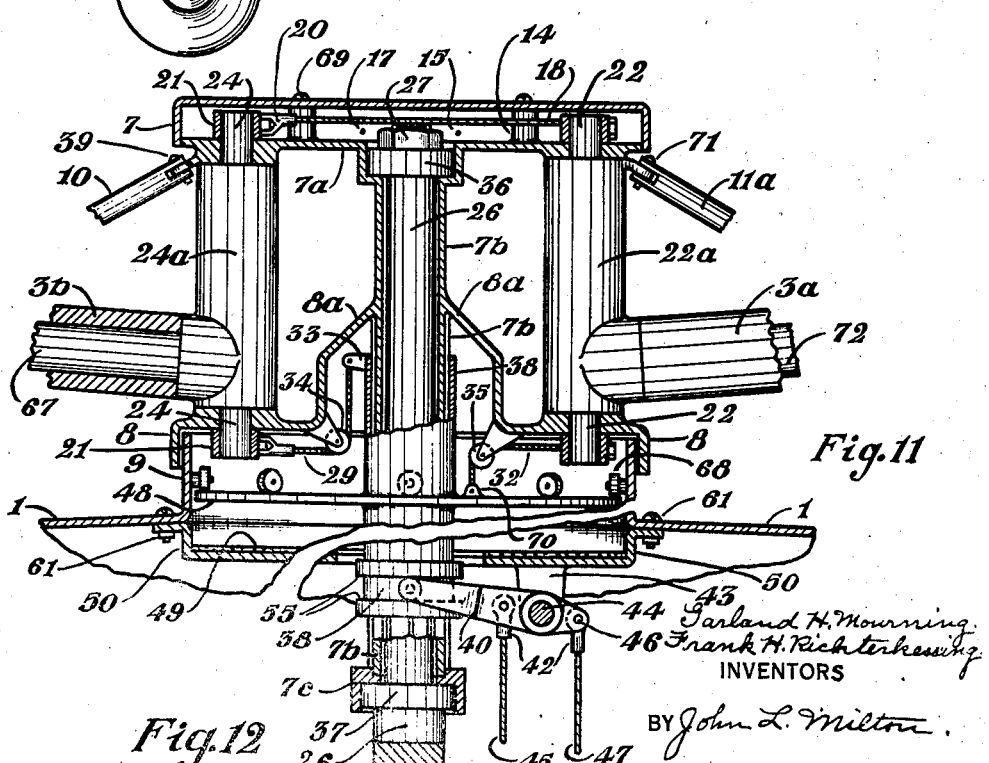
Fig.11
Fig.12
Garland H. Mourning
Frank H. Richterkessing
INVENTORS
BY John L. Milton
ATTORNEY

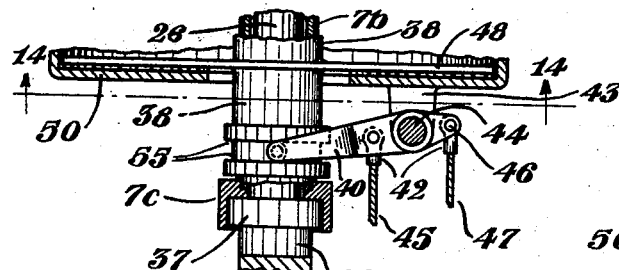

July 15, 1941.   G. H. MOURNING ET AL   2,249,026
AIRPLANE
Filed Feb. 28, 1938    6 Sheets-Sheet 5

Garland H. Mourning.
Frank H. Richterkessing.
INVENTORS

BY John L. Milton
ATTORNEY

July 15, 1941.   G. H. MOURNING ET AL   2,249,026
AIRPLANE
Filed Feb. 28, 1938   6 Sheets-Sheet 6

Garland H. Mourning.
Frank H. Richterkessing.
INVENTORS

BY John L. Milton
ATTORNEY

Patented July 15, 1941

2,249,026

UNITED STATES PATENT OFFICE 2,249,026

AIRPLANE

Garland H. Mourning and Frank H. Richterkessing, Louisville, Ky., assignors to John L. Milton, Louisville, Ky.

Application February 28, 1938, Serial No. 193,150

8 Claims. (Cl. 244—7)

This invention relates to aircraft, and more particularly to a flying machine that can be piloted in the same manner as a conventional airplane, but which is convertible into aircraft of the type having rotative sustaining means, in which the sustaining means takes the form of a horizontal wing convertible into a rotor composed of a plurality of sustaining blades or wings actuated by relative air flow.

In addition to facilitating landing, etc., the principal object of converting a fixed straight-flight wing into a rotative sustaining means, is to provide means for retarding the fall of such aircraft in the event of failure of motive power, yet providing, when not so converted, the desirable straight-flight operating qualities of a conventional power-driven gliding airplane, such as speed, maneuverability, efficiency in operation, and general all round performance.

Thus, it is the object of this invention to provide a sub-divided horizontal wing, carried by a substantially upright axis structure, that is capable of ready and instant conversion into a multiple-blade sustaining rotor for effecting a safe and controlled landing in restricted spaces, or in emergencies, and which is further capable of ready and instant conversion into a fixed, horizontal-wing providing the required characteristics for conventional straight-flight aircraft.

Therefore, this invention provides in a single aircraft, the superior advantages of conventional airplane structure for ordinary and normal flying, and in addition the desirable safe landing qualities of the wind-driven sustaining rotor.

The invention furthermore, is specifically concerned with the novel arrangement and construction of the convertible sub-divided wing, whereby such wing may constitute the primary means of sustention for the aircraft, and also of certain supplemental lifting surfaces or wings with which the aircraft may be equipped without affecting the dual operating qualities of the convertible sub-divided wing.

Another object of the invention resides in the arrangement and mounting of the sub-divided wing so as to minimize, and reduce materially, objectionable forces encountered in both normal and rotative positions.

A still further object of this invention resides in the arrangement of the sustaining parts of the sub-divided wing so that roughness and vibrations in the rotor system are reduced materially, thereby minimizing dangers incident to fatigue in such parts.

Another object of this invention resides in the novel construction and arrangement of the mechanism through which the sub-divided wing is readily and instantly converted from a sustaining means having fixed wing qualities into one having the qualities of a multiple-blade rotor wing, driven or actuated by the relative atmospheric air flow, or vice versa.

A further object of my invention resides in the novel construction and arrangement of the aforesaid mechanism, whereby the conversion can be readily and substantially instantly provided while the aircraft is in flight or landed.

A still further object of this invention resides in the novel construction and mounting of the blades forming the sub-divided wing in such a manner that they will, when in rotor position, unitarily rotate about a common axis as a result of air flow produced by the motion of the aircraft in terms of the atmosphere, and which will automatically change pitch, when moved to the rotor position or restored to fixed-wing position, to provide the proper wing characteristics in either position; the mounting of the blades being such as to permit independent vertical articulation of each blade whereby each blade can be relatively free to move independently in a vertical plane, and thereby be able to assume various positions under the influence of centrifugal, lift, and other forces.

In addition to the foregoing, it should be borne in mind that the sub-divided wing structure is preferably located above the fuselage of the aircraft, so as to raise the center of gravity of the aircraft as a whole, when such wing is set to form a multiple blade rotatable sustaining means, and to prevent any portion of such rotating system from fouling on any part of the aircraft. However, the location of the sub-divided wing may be varied to accommodate specific requirements, as influenced by the design and construction of the remaining parts of the aircraft.

Another object of this invention resides in the provision of braking means for retarding rotation of the blades of the sub-divided wing, just prior to their restoration to fixed-wing position.

Another object of this invention resides in the provision of means that will effectively and definitely lock the blades of the sub-divided wing in fixed-wing position, and in correct relation with respect to the fuselage of the aircraft.

To this end, this invention provides an aircraft having conventional fixed-wing characteristics in normal flight, in which the sustaining wing for normal flight is sub-divided longitudinally into a plurality of blades or wings each blade preferably having a symmetrical profile providing both structural and aerodynamic characteristics for proper rotative sustaining operation, and of such symmetrical profile that will permit two or more such blades combining to form a fixed wing having good structural and aerodynamic characteristics for normal flight.

The convertible sub-divided wing is provided with a special mounting selectively permitting rotation of the blades thereof as a wind-driven sustaining rotor, or retaining the rotatable blades in fixed position and cascaded to form a fixed horizontal wing, with means for readily and quickly changing from one to the other at the will of the operator.

While each blade is preferably of a symmetrical form, adopting it to efficient operation either as a conventional airplane fixed wing, or a rotating sustaining propeller, certain features of this invention are independent of any particular form of the blades or subdivided wing.

For a better understanding of the invention, reference is made to the accompanying drawings in which:

Figure 4 is a partial plan view of the upper pivot plate in Figure 3, with cover 7 removed to show the relation of certain operating cables, when the blades of the sub-divided wing are in the position illustrated by the solid lines of Figure 1;

Figure 5 is a partial sectional view of the lower pivot plate in Figure 3, as viewed from the underside, showing the relation of the main operating cables, when the blades of the sub-divided wing are in the position illustrated by the solid lines of Figure 1;

Figure 6 is a partial sectional view, as viewed from the under-side of Figure 12, showing the construction of the operating lever 40;

Figure 7 is a partial section along lines 7—7 of Figure 4 showing the construction of a cable lever arm 21;

Figures 8 and 9 show the construction of the upper and lower main central bearings appearing in Figures 11 and 12 respectively;

Figure 10 is an enlarged partial elevational view of Figure 2, illustrating the wall of the fuselage partially removed to show the lever 76 that enables the pilot to actuate the sub-divided wing;

Figure 1:
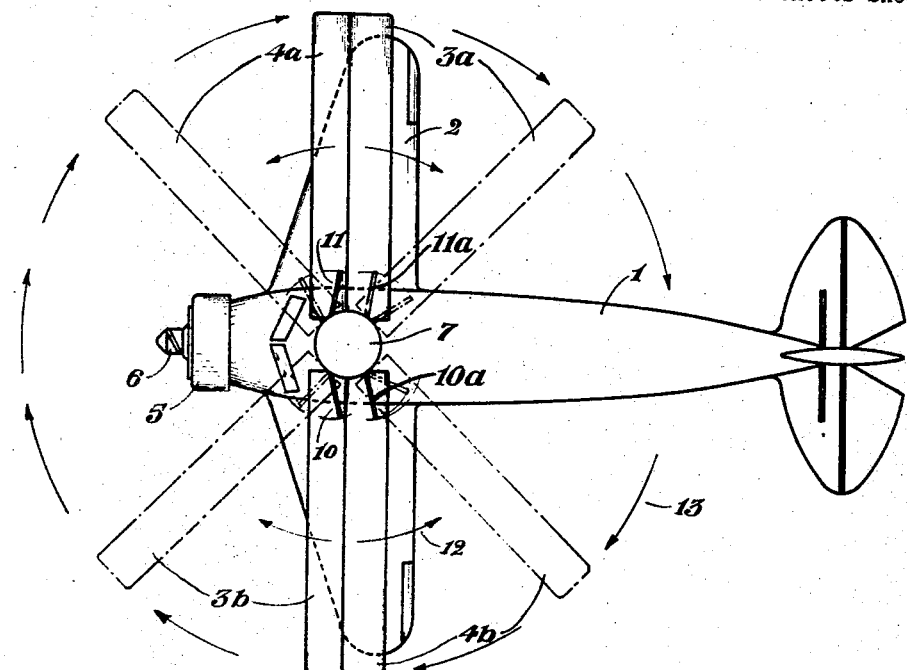
Figures 1, 2 and 3 are general views of an airplane embodying the invention.
Figure 19:
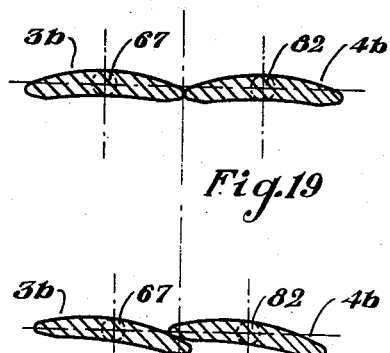
Figure 25:
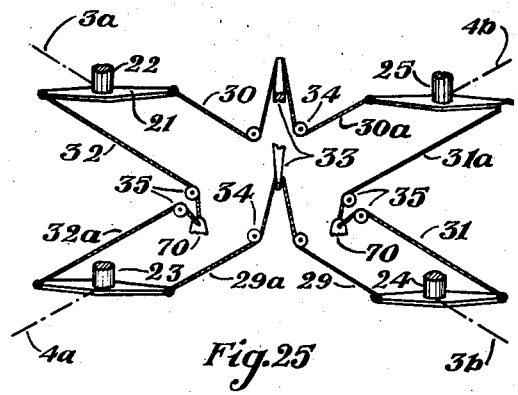
Figure 20:
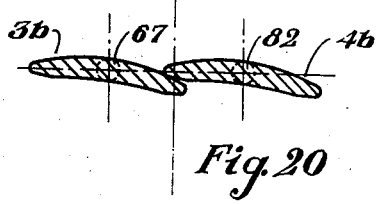
Figure 21:
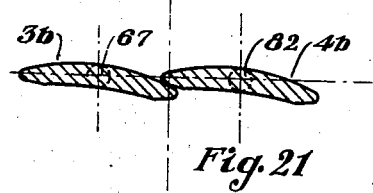
Figure 26:
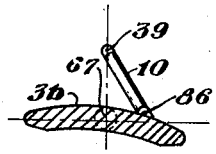
Figure 22:
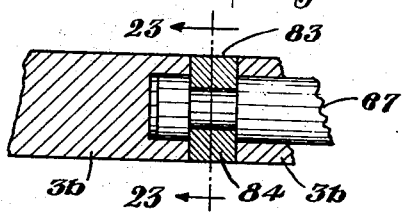
Figure 27:
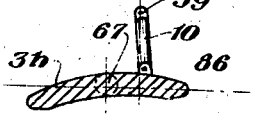
Figure 23:
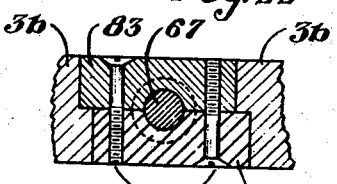
Figure 24:
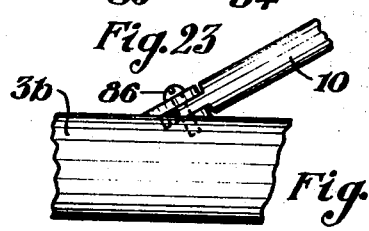

Figure 11 is a partial section taken along lines 11—11 of Figures 4 or 5, showing the construction and relation of the blade supports carried by plates 7a and 8, when the blades are in the position illustrated by the dot-dash lines of Figure 1;

Figure 12 is a partial section taken along lines 12—12 of Figure 4, showing the position of operating lever 40, when the blades are in the position illustrated by the dot-dash lines of Figure 1;

Figure 13 is similar to Figure 12, and shows the position of operating lever 40, when the blades are in the position illustrated by the solid lines of Figure 1;

Figure 14 is a partial plan view, as viewed along lines 14—14 of Figure 13, showing the devices for locking the blades in non-rotating position;

Figures 15, 16 and 17 illustrate modified forms of locking devices illustrated in Figure 14;

Figure 18 illustrates a modification of Figure 13, wherein the central bearing post is shown re-inforced by a yoke 66;

Figures 19, 20 and 21 are partial diagrammatic sections of the rotatable blades of the sub-divided wing; Figure 19 showing no pitch for the blades when in normal flight position, while Figures 20 and 21 illustrate changes in pitch as effected by changing the distance between pivots 61 and 82;

Figures 22 and 23 are partial diagrammatic sections illustrating the construction of the blade pivots permitting changes in blade pitch;

Figure 24 is a partially enlarged view showing the connection of strut 10 to blade 3b;

Figure 25 is a diagrammatic view showing the operative connections of the main operating cables of Figure 5, and the relations thereof when the blades are in the position illustrated by the dot-dash lines of Figure 1;

Figures 26 and 27 illustrate the changing in pitch of blade 3b;

Figures 28 through 32 illustrate a modified arrangement and construction for the sub-divided wing, and the relative mode of operation of the blades.

Figure 2:
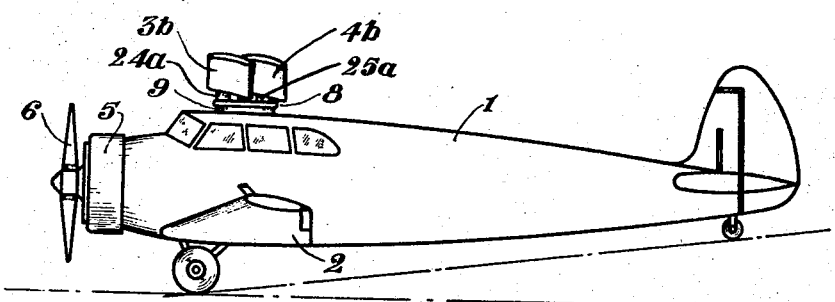
Figure 3:
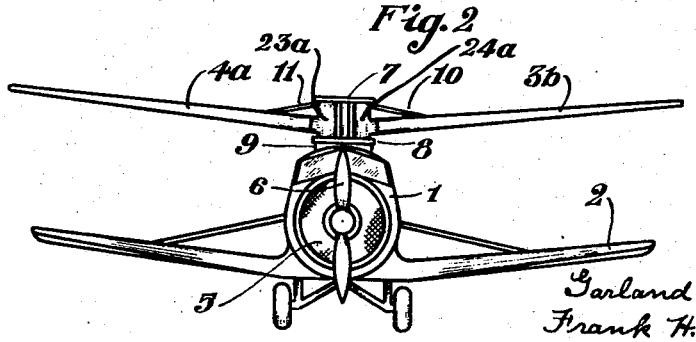

Referring more in detail to the aforesaid drawings, it will be observed that, in Figures 1, 2 and 3, a conventional low-wing cabin monoplane is equipped with the invention, thereby converting same into an aircraft simulating conventional bi-plane operation, when the additional upper divided-wing is in straight flight conditions. The solid lines of Figure 1, indicate the ascension or conventional normal-flight of the aircraft; this being according to standard conventional airplane practice. Figures 2 and 3 are side and front elevations, respectively, of the aircraft in the aforesaid ascension or conventional normal-flight condition. The dot-dash lines of Figure 1, indicate the relative positions of the blades forming the upper divided-wing, when actuated to provide a multiple blade sustaining propeller. According to the particular pitch of the blades, employed in the present illustration of the invention, the blades, when forming the sustaining propeller, rotate in the direction indicated by circular arrows 13, as a result of relative air-flow thereover. It is important to observe the particular movement of each blade of the upper divided-wing, while the blades are moving to and from sustaining propeller position. For instance, blades 3a and 4a move toward each other, when moving to form a wing for conventional straight flight, and, at the end of such movement assume a position substantially parallel one to the other and at right angles to the fuselage of the aircraft. Similarly, blades 3b and 4b function. Thus, in conventional straight-flight condition, the profiles of blades 3a—4a and 3b—4b combine to form a profile suitable for conventional straight-flight, having an efficiency approaching, or practically equaling, the aerodynamic efficiency of many of the fixed conventional, uni-directional and unsymmetrical, aerofoil sections.

On the other hand, longitudinally opposed straight-flight blades 3a and 4b move toward each other, when moving to form a multiple blade sustaining propeller, and assume a position substantially at right angles one to the other. Similarly, blades 3b—4a function. Thus, in sustaining propeller condition, blades 3a and 3b are substantially diametrically opposed; likewise blades 4a and 4b. In this condition the blades are free to rotate about a common axis.

To provide the upper divided wing with an angle of attack to improve wing lift conditions, each blade must be inclined in the same direction, when in conventional straight-flight position. Therefore, when such inclined blades are moved to form a rotating sustaining propeller, only two adjacent blades, for instance 3a and 4a, are pitched in the proper direction. Accordingly, when moving from straight-flight to sustaining propeller positions, the angle of inclination of blades 3b and 4b must be reversed to correspond with that of blades 3a—4a. It is also important to observe that the changing of the direction of inclination of blades 3b and 4b is provided for in such a manner that diametrically opposed rotating blades 3a—3b and 4a—4b rotate in substantially the same plane.

Thus, in sustaining propeller position, the blades rotate simultaneously about a common axis in a clockwise direction; the trailing edge of each blade being higher than the leading or forward edge.

While it is customary to proportion and construct aircraft to provide inherent stability, the invention provides for changes in "wing dihedral," of the upper divided-wing, to obtain proper lateral stability, and thereby compensate for changes in stability that may result when the invention is applied to a conventional monoplane.

It is to be further understood that, while the divided-wing may be readily and easily applied to a conventional low-wing monoplane, this invention also has for its purpose the design of aircraft of various types incorporating the combined functions of the divided wing. For instance, in applying the principles of this invention to a high-wing monoplane, the single wing is divided, and proportioned to provide proper flight characteristics in both conventional straight-flight position and sustaining propeller position. Similarly, the upper wing of a conventional bi-plane may be so designed.

In Figure 1 there is diagrammatically illustrated a sub-divided wing 3a—3b—4a—4b mounted for permissible rotation about a vertical bearing arranged within the cabin of the aircraft. A lower wing 2 is also illustrated and provided with the necessary ailerons for the aircraft. At the rear end of the fuselage 1, a conventional rudder and elevator assembly is shown; while at the front end of the fuselage, a radial engine 5 and propeller 6 is illustrated.

In Figs. 2 and 3, a cylindrical chamber 9, projecting from the top of the fuselage 1, is covered by a lower circular plate 8 of the sub-divided wing assembly. Rigidly attached to the lower plate 8 is an upper circular plate 7. Four vertical, propeller-blade sustaining posts 22a, 23a, 24a and 25a are pivotally mounted between plates 7 and 8, and each post carries a corresponding blade 3a, 4a, 3b and 4b respectively. In Figs. 1 and 3, struts 10, 10a, 11 and 11a are illustrated connecting their respective blades 3b, 4b, 4a and 3a. These struts serve normally to reinforce the blades for straight flight, and further serve to control the angle of attack of the blades of the sub-divided wing assembly as will be described in detail as the description advances.

Reference is now directed to Figs. 11 and 12, which show the general arrangement of the mechanism for actuating the sub-divided wing assembly. It will be observed that the cylindrical chamber 9, projecting upwardly from the fuselage 1, terminates within a depending flange of the lower circular plate 8. The central portion of plate 8, via wall members 8a, forms a dome-shaped cylindrical chamber, which is connected at its apex to sleeve 7b. The upper end of sleeve 7b carries a thrust roller-bearing, the particular construction of same being represented in Fig. 8. The lower end of sleeve 7b is secured to a bearing cup 7c, which carries a thrust roller-bearing 37, the particular construction of same being represented in Fig. 9. The outer race of the upper bearing 36 is secured to sleeve 7b, while the inner race of same is secured to the stationary vertical-shaft 26. Similarly, the outer race of the lower bearing is secured in the bearing cup 7c, while the inner race of same is secured to the stationary vertical-shaft 26.

The upper end of sleeve 7b is secured to a circular plate 7a; a circular cover plate 7 being attached to plate 7a, via screws 69. Each of the plates 7a and 8 are provided with suitable aligning bearings, which pivotally support their respective propeller-blade sustaining posts 22a, 23a, 24a and 25a between plates 7a and 8. Referring in particular to sustaining post 24a in Fig. 11, it will be observed that the upper and lower ends of the sustaining post are reduced in diameter to provide bearing portions 24. It will be further observed that a lever 21 is secured to each bearing portion 24, as particularly illustrated in Fig. 7.

Between the junction of wall members 8a with sleeve 7b, and bearing cup 7c, the sleeve 7b is splined providing a reciprocating bearing surface for actuating member 38. Figs. 5, 6 and 14 each show the splined construction of actuating member 38 and sleeve 7b. Referring again to Fig. 11, it will be observed that the actuating member 38 carries a circular plate 48, which, when the member 38 is in its upper position, embraces rollers 68 to limit the upward movement of member 38 and to distribute the thrust of the rotating wing assembly onto rollers 68. In Fig. 11 the plate 48 is represented engaging rollers 68, in which condition the sub-divided wing assembly is actuated to its sustaining propeller position, as will be hereinafter described in detail.

Attached to the fuselage 1, is a depending circular member 50, having a central aperture through which actuating member 38 passes. Bolts 61 serve to secure the circular member 50 to the fuselage 1. On the upper surface of member 50, a circular braking medium 49 is secured, which serves to retard rotation of the rotating wing assembly, when the actuating member 38 is moved to its lower position. When the actuating member 38 is in its lower position, the sub-divided wing assembly is actuated to its normal or conventional straight-flight position, as will be hereinafter described in detail. Fig. 13 shows the relation of circular plate 48, braking medium 49 and actuating member 38, when the latter is in its lower position.

As represented in Figs. 6, 12 and 14, bearing lugs 43 are secured to the lower surface of member 50. A lever 40 is pivotally secured to said lugs 43 via a bearing pin 44. As illustrated in Fig. 6, lever 40 is provided with a pair of rollers 41, which engage bearing surfaces 55 provided by a pair of annular rings carried by the lower end of actuating member 38. Thus, in the rotating condition of the rotating wing assembly, rollers 41 permit actuating member 38 to revolve freely. Referring in particular to Fig. 12, it will be observed that a pair of cables 45 and 47 are provided with suitable cable ends 42, which are pivotally secured to lever 40 via pins 46. Thus, a downward pull on cable 45 lowers the actuating member 38, while a downward pull on cable 47 raises the actuating member 38.

To facilitate operation of cables 45 and 47, a suitable hand operated lever 76 is provided, as illustrated in Fig. 10. To further assist in the operation of cables 45 and 47, suitable pulleys 79 and 80 are provided. To retain the hand operated lever 76 in either of its extreme positions, a conventional plunger-operated spring catch 75 is provided. Thus, with the hand operated lever in its forward position, as illustrated, the actuating member 38 is in its lower position. Accordingly, when the hand operated lever 76 is the reverse position, the actuating member 38 is in raised position.

With further reference to Fig. 10, it will be observed that the vertical shaft 26 is reinforced by means of a cross bar 74 anchored to the sides of the fuselage, and a flange which secures the shaft to a floor 81 within the fuselage.

Having thus far described the relation and construction of the principal actuating parts, reference is now directed to Figs. 4, 5, 11 and 25 for an understanding of the manner of operation of the sub-divided wing assembly and associated parts.

Referring in particular to the upper portion of Fig. 11, and Fig. 4, it will be observed that four cables 15, 17, 18 and 19 connect diagonally disposed levers 21; each cable being provided with a suitable cable end 20 and pin 28. In observing the construction illustrated in Fig. 4, it must be remembered that the parts are shown in their positions assumed when the sub-divided wing assembly is in the conventional or straight-flight condition, and that such parts are as would be seen with the cover plate 7 removed in Fig. 1. To further assist in the understanding of Fig. 4, dot-dash lines radiate from each bearing post 22, 23, 24 and 25, which represent the center lines of their corresponding sub-divided wing blades. Thus, characters 3a, 4a, 3b and 4b, which correspond with the sub-divided wing blade indentifications, designate the center lines of the relative blade positions with the levers as shown in heavy lines. Accordingly, it will be apparent that, as each lever 21 is moved to its indicated dotted position, each corresponding blade will move through the angle indicated by the letter A. When thus moved to this position, the sub-divided wing assembly will assume its sustaining propeller condition. From the foregoing, it is believed obvious that cables 15, 17, 18 and 19 serve primarily as load distribution cables, and do not directly govern operation of the blades of the sub-divided wing assembly. Thus, for an understanding of the relation and operation of the cables serving to govern the operation of the blades of the sub-divided wing assembly, reference is directed to the lower portion of Fig. 11, Fig. 5 and Fig. 25.

As hereinbefore described, actuating member 38 is splined to sleeve 7b, and is further constructed and arranged for reciprocating movement on sleeve 7b. From the figures now under consideration, it will be observed that the circular plate 48 is provided with a pair of diagonally arranged cable anchoring lugs 70, and, similarly, actuating member 38 is provided with a pair of diagonally arranged cable anchoring lugs 33 at its upper end. To assist in understanding the relation of the principal operating cables 29—29a, 30—30a, 31—31a and 32—32a, reference is directed to Fig. 25. In Figure 25, the levers 21 are illustrated in their positions assumed when the blades of the sub-divided wing assembly are in their sustaining propeller condition, that is, actuating member 38 in its raised position. It is believed that the diagrammatic illustration of the cables in Figure 25 is sufficiently clear to require no further explanation, thus the operation of same will now be outlined.

Thus, since the actuating member 38 is assumed to be in its upper position, in illustrating the corresponding positions of the levers 21 and operating cables in Figure 25, it will now be assumed that the actuating member 38 is moved to its lower position. Under such condition, lower lugs 70 and upper lugs 33, carried by actuating member 38, move simultaneously downwardly. In so moving, lugs 70 exert tension on their associate cables 32—32a and 31—31a, rotating their corresponding levers 21 toward their conventional flight position. It is also important to observe that, as lugs 70 exert tension on their associate cables, lugs 33 relieve tension on their associate cables 30—30a and 29—29a. Thus, a definite rotation of each lever 21 is provided through a 45 degree angular movement. Obviously, actuating member 38 in raising provides a reverse operation of the cables 29—29a, 30—30a, 31—31a and 32—32a.

Coordinating the showing of Figures 25, 11 and 12 with Fig. 1, it will be observed that the relative positions of the parts shown in Figures 25, 11 and 12 correspond with the dot-dash positions of the sub-divided wing blades in Fig. 1. Similarly, the relative positions of the parts shown in Figures 4, 5, 10 and 13 correspond with the full line positions of the sub-divided wing blades in Figure 1. To assist in the understanding of Fig. 5, dot-dash lines, similar to those employed in Fig. 4, radiate from each bearing post 22, 23, 24 and 25, which represent the center lines of their corresponding sub-divided wing blades. Thus, characters 3a, 4a, 3b and 4b, which correspond with the sub-divided wing blade identifications, designate the center lines of the relative blade positions with the levers as shown in heavy lines. Accordingly, as each lever 21 in Figure 5 is rotated to its indicated dotted position, each corresponding blade will move through the angle indicated by the letter A.

In the performance of this invention, it is essential that the sub-divided wing assembly assume a definite position with respect to the fuselage of the craft, when the sub-divided wing assembly is in the conventional or normal flight condition. To provide for this feature, suitable locking pawls are provided, and arranged as illustrated in Fig. 14. In order to distribute the forces, a plurality of pawls are provided, each disposed on a different radius and adapted to register with a corresponding aperture in the circular plate 48. To further assist in the understanding of the construction and operation of the locking pawls of Figure 14 reference is also directed to Figure 15.

It will be noted that for each pawl a pair of bearing lugs 52a are secured to the lower surface of circular member 50. The pawl member consists of a tapered locking pin 51 carried by a suitable lever 52 which is pivotally secured to the pair of bearing lugs 52a via pin 53. A weight 54 serves to bias locking pin 51 toward the circular plate 48. With the foregoing construction it will be apparent that an automatic locking and unlocking arrangement is provided, and one that will provide definite alignment of the sub-divided wing assembly with the fuselage.

To understand the operation of the locking pawls it will be assumed that the actuating member 38 is raised. Under this condition, circular plate 48 will disengage the brake medium 49 and lift free of the locking pins 51. When the actuating member 38 is thus raised, the subdivided wing blades assume their sustaining propeller positions and since circular plate 48 is free of the locking pins 51, the sub-divided wing assembly is free to rotate as hereinbefore described.

In restoring the sub-divided wing blades to conventional or normal flight conditions, actuating member 38 is moved to its lower position. In moving to its lower position, circular plate 48 will depress locking pins 51, by reason of the pivotal construction of lever 52, and engage the braking medium 49 to retard rotation of the subdivided wing assembly. When the circular disc has reduced its speed sufficiently, and the apertures in circular plate 48 comparatively slowly move into aligning position with their corresponding locking pins 51, the pins 51 will drop into the apertures, and rigidly lock the subdivided wing assembly in its proper position. Obviously, as long as the circular plate 48 rotates at a comparatively high speed, the locking pins will not have sufficient time to drop into their corresponding apertures, and will be repeatedly knocked away from the plate 48 until the wing assembly practically ceases rotation.

In Figure 17 a spring-pressed locking pin 62 is illustrated as an alternate arrangement for the locking pawl shown in Figure 15. In Figure 17, a cylindrical member 63 is secured to the lower surface of the circular member 50, and serves as a guide for the tapered locking pin 62. A spring 65 serves to bias the pin toward the circular plate 48. Its operation is analogous to that outlined for Figs. 14 and 15.

In Figure 16, the structure illustrated in Fig. 17 is modified and provided with an electro-magnet 59, which is adapted to be connected to a suitable source of power view wires 60. When so connected the electro-magnet 59 will attract locking pin 56, and retain same out of the path of the circular plate 48 as long as the electro-magnet remains energized. To provide selective control of the electromagnet 59, a suitable electrical switch is arranged for operation by the pilot of the craft.

In Figure 12, the lever 40 is illustrated as being pivotally secured directly to the lower surface of the circular plate 48. In Figure 18 a modified construction is illustrated, which provides a yoke member 66, secured to the roof of the fuselage having suitable bearing lugs for the pivot pin 44. It is also important to note that the yoke 66 also serves to anchor the stationary post 26 to the fuselage.

As expressed hereinbefore, each blade 3a, 3b, 4a, and 4b is preferably of a symmetrical form, adopting it to efficient operation either as a conventional airplane fixed wing, or a rotating sustaining propeller. Figs. 19, 20, 21, 26 and 27 illustrate a suitable profile form for the blades. Taking for example blade 3b in Fig. 19, it will be observed that the blade has a profile form substantially symmetrical about a line perpendicular to the middle of its chord. Concerning the shape of the blade throughout its length, it has been found that the blade may be tapered, double trapezoid, or any other suitable form, and may have a uniform profile form throughout, or the profile form may vary from point to point along its span.

Each blade is preferably formed as illustrated in Figs. 19, 20, 21, 26 and 27, and, in the embodiment, the profile form is varied from root to beginning of tip so as to provide a proportional tapering in the thickness of the blade. In this respect attention is directed to Fig. 3.

Referring in particular to Figs. 19, 20 and 21, it will be observed that the angle of attack of the upper divided-wing assembly is governed by the distance between the pivotal centers of the blades and the width of the blades. Thus, Fig. 19 illustrates no angle of attack for the upper wing assembly, while Figs. 20 and 21 illustrate changes in the angle of attack, as determined by the amount of overlap of adjacent blades, for instance, 3b—4b.

As previously mentioned, the angle of blades 3b and 4b must be reversed when all blades are actuated to their sustaining propeller positions. This requirement will be obvious upon inspection of Fig. 1, as blades 3b and 4b, in moving to the position indicated by their corresponding dot-dash lines, must have their angle of attack reversed in order to provide for rotation in the direction indicated by circular arrows 13.

Referring now to Fig. 11, it will be observed that blades 3b and 3a are each secured to their corresponding posts 24a and 22a through the medium of arms 67 and 72, respectively. In this respect, it is to be understood that blades 4a and 4b are similarly mounted; Figs. 2, 3 and 10 indicating such a construction. It is to be further understood that each arm 67, 72 and 73 etc. has its center line registering with its corresponding dot-dash line radiating from its corresponding post, as illustrated in Figs. 4, 5 and 25. To further exemplify this construction, reference is directed to Figs. 22 and 23, which illustrate the specific construction of arms 67 for blade 3b. Thus, it is to be understood that all blades and associate arms are similarly constructed.

Referring now to Figs. 22 and 23, it will be observed that blade 3b is pivotally mounted on arm 67, which is carried by bearing post 24a. Note also Fig. 11. To absorb the radial thrust of each arm, when the blades are in their rotating, sustaining propeller position, a split collar composed of blocks 83 and 84 is provided for each arm, and secured in position by screws 85.

As stated hereinbefore, each blade is provided with a strut 10, 10a, 11 and 11a, to reinforce its corresponding blade, and to govern the angle of attack of its blade. Thus, since the angle of attack of blades 3a and 4a is to remain the same in both normal-flight and sustaining propeller positions, struts 11 and 11a are each secured to their corresponding bearing posts 22a and 23a. Obviously, therefore, the relation of each blade 3a and 4a to its bearing post will remain the same in either of its operating positions. However, struts 10 and 10a are each pivotally secured to the upper circular plate 7a. Thus, the relation of blades 3b and 4b with respect to their corresponding bearing posts 24a and 25a will be different in each of their operating positions. To illustrate this relation, reference is directed to Figs. 26 and 27, and to Fig. 11. In Figs. 26 and 27 it will be observed that the relatively stationary pivotal connection 39, through strut 10 causes blade 3b to rotate partially about arm 67, when the blade is moved from its normal flight position illustrated in Fig. 26 to its sustaining propeller position illustrated in Fig. 27. Thus, the angle of attack of blades 3b and 4b in sustaining propeller position is changed to correspond with that of blades 3a and 4a, so as to provide for rotation of the sub-divided wing assembly in the direction indicated by circular arrows 13. Obviously, upon restoring blades 3b and 4b to their normal flight positions, their angle of attack will be restored to correspond with that of blades 3a and 4a for proper normal flight condition. Fig. 24 illustrates the typical mounting construction of each strut to its corresponding blade; blade 3b and strut 10 having been selected for illustrative purposes only. In Fig. 1 the respective arcuate path of each strut is illustrated via dot-dash lines, which are believed to designate clearly the structural and functional relation existing between the blades and their corresponding struts.

Accordingly, the foregoing description has clearly described the functional and structural relations of all the parts of the invention, as represented in the particular embodiment of the invention illustrated in Figs. 1 through 27, inclusive. Therefore, a summary operation of the embodiment will now be presented.

In normal, or straight-flight conditions, the blades of the sub-divided wing assembly assume the position illustrated in Figs. 1, 2 and 3. In this condition, the relation of the blades forming the sub-divided assembly will simulate the operation of a conventional, unidirectional and unsymmetrical, aerofoil section. Thus, the desirable quantities of a conventional power driven gliding airplane, such as speed, maneuverability, efficiency in operation, etc., are retained.

To provide for a ready and instant conversion of the aircraft into one having a multiple-blade sustaining propeller for effecting a safe and controlled landing in restricted spaces, or in emergencies, mechanism, actuatable through a system of cables via a central lever 76, is provided. Therefore, the operator of the aircraft, by operating lever 76 to its rearward position, automatically releases the brake, release the mechanical aligning lock on the sub-divided wing structure, moves the blades to form a rotative sustaining propeller, and automatically and simultaneously provides a proper angle of attack for each blade, whereby the relative air flow over the sustaining blades will place the sub-divided wing assembly into rotation, as represented by circular arrows 13.

From sustaining-propeller position the operator may restore the blades to their normal flight conditions by merely restoring central lever 76 to its normal position. Obviously, the latter may be accomplished while in flight or landed, according to the will of the operator of the aircraft. Similarly, the operation of the aircraft to a sustaining propeller condition may be effected prior to take-off under which condition the operation of a conventional auto-gyro is simulated.

In restoring from sustaining propeller to normal flight conditions, lever 76 is pushed forwardly, which automatically and simultaneously restores the blades to their normal positions, applies a brake to reduce gradually the rotation of the sub-divided wing assembly under the control of the operator, and automatically locks the blades in their normal flight conditions in proper alignment with the fuselage of the aircraft. Thus, the device being entirely automatic in its operation is foolproof, and requires a minimum of attention by the operator, which is of extreme importance in the case of emergencies.

A very important feature resides in the construction and arrangement of the mechanisms, such as to employ cables and other light-weight constructions affording the maximum strength for the least weight, which is of extreme importance in the design of aircraft.

While the particular embodiment of the invention, relies entirely on the relative airflow over the blades, and their movement to sustaining propeller position, to initiate the rotation of the sub-divided wing assembly, it is to be understood that the construction of the embodiment is such that a mechanical or electrical initiating device may be incorporated to facilitate initial rotation of the sub-divided wing assembly.

Figs. 28 through 32 inclusive, illustrate a modified embodiment of the invention, so that it will be obvious to those skilled in the art the various forms the invention may assume. Thus, having made a clear exposition of the functional and structural characteristics of the invention illustrated in Figs. 1 through 27 inclusive, only the salient features illustrated in Figs. 28 through 32 will be indicated.

Figure 28:
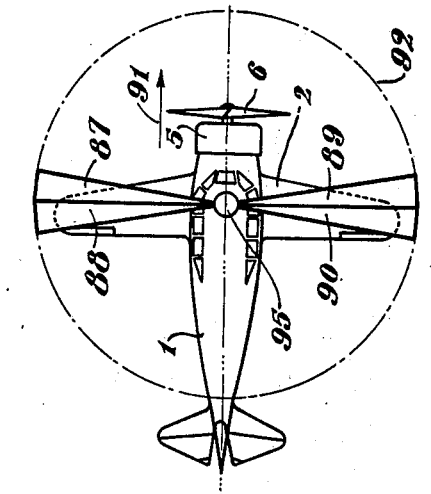
Figure 31:
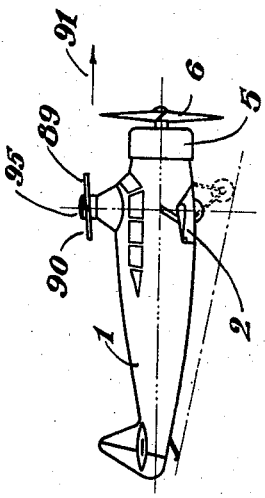
Figure 29:
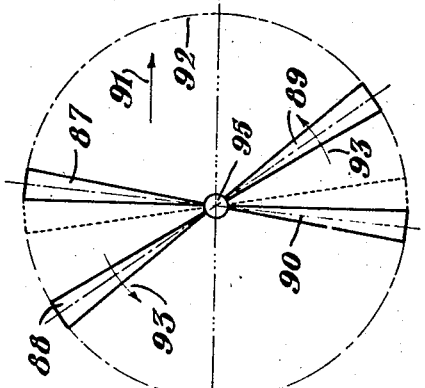
Figure 30:
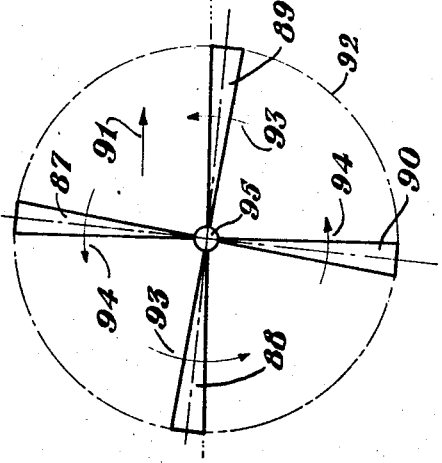

In Fig. 28, it will be observed that the aircraft contemplates an upper sub-divided wing structure in which the diagonally opposed blades are interconnected; Fig. 31 illustrating the typical relation of the blades, and their combined profile form. Figs. 29 and 30 illustrate the operation of the blades to their sustaining propeller positions. Thus, the diagonally opposed blades 88 and 89 rotate through 90 degrees to reach their sustaining propeller positions, instead of the 45 degree movement indicated in Fig. 1 of the former embodiment. It is also important to note that, relatively, diagonally opposed blades 87 and 90 are stationary while blades 88 and 89 move through their 90 degree path. Fig. 30 illustrates the relation of the blades in their sustaining propeller position.

Figure 32:
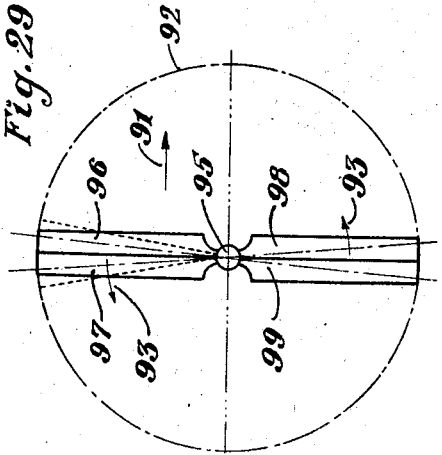

In Figs. 28, 29 and 30, the blades of the sub-divided wing assembly are illustrated as having a triangular shape. In Fig. 32 the blades are arranged to provide a conventional aerofoil shape. Thus, with the thorough exposition of the construction of the former embodiment embraced by Figs. 1 through 27, it is believed the structural modifications embraced by Figs. 28 through 32 will be manifest to those skilled in the art, and that their teachings are adequately sufficient to permit a complete practicing of same in accordance with the spirit and intent of this disclosure.

Having thus described the invention, we claim:

1. A device for use with a heavier than air machine comprising, a support rotatably mounted upon the fuselage of the said machine; four blades each pivotally secured to the said support for a lateral movement in the same plane; means operatively connected to each of the said blades for moving them into a position substantially at right angles one with the other to form an aerodynamically-driven rotating wing system, and for folding the blades in pairs into longitudinal alignment one with the other to form a substantially uniform longitudinal wing structure; means operatively associated with the said support for retaining the said rotatable support stationary so that the folded blades project substantially longitudinally outwardly and beyond opposite sides of the said fuselage; and means releasing the said retaining means when the blades are moved to form the said rotating wing system.

2. A device for use with a heavier than air machine comprising, a support rotatably mounted above the fuselage of the machine for rotation substantially in a horizontal plane; four blades each pivotally secured to the said support for lateral movement in the plane of rotation thereof; means operatively associated with each of the said blades for moving them laterally into open positions substantially at right angles one with the other to form a wind-driven sustaining propeller, and for moving the blades laterally into folded pairs longitudinally in alignment one with the other to form a horizontal wing structure simulating the operation of a conventional fixed gliding wing; means operatively associated with the said support for retaining the same relatively stationary with the folded blades extending substantially longitudinally outwardly and beyond opposite sides of the fuselage; and means for releasing the said retaining means, when the blades are moved to form the said wind-driven sustaining-propeller.

3. A device for use with a heavier than air machine comprising, a support pivotally mounted upon the fuselage of the machine for rotation in substantially a horizontal plane; four blades each pivotally secured to the said support for lateral movement in the plane of rotation thereof; means operatively associated with each of the said blades for moving them laterally about their respective pivotal axis into open positions substantially at right angles one with the other to form a wind-driven sustaining-propeller; and means operatively associated with each of the said blades for moving them laterally about their respective pivotal axis into closed positions of folded pairs longitudinally in alignment one with the other to form a horizontal wing structure simulating the operation of a conventional fixed gliding wing.

4. A device for use with a heavier than air machine comprising, four blades pivotally mounted upon the fuselage of the machine for rotation in substantially a horizontal plane as a wind-driven sustaining propeller, each blade having an individual pivotal connection for lateral movement, in the plane of rotation of the said propeller, into relatively closed positions to form a horizontal wing structure simulating the operation of a conventional fixed gliding wing; means operatively associated with each of the said blades for moving them laterally about their respective individual pivotal connections into closed positions of folded pairs longitudinally in alignment one with the other to form the said horizontal wing structure; means operatively associated with the said blades for retaining the same relatively stationary in their closed positions; means for releasing the said retaining means; and means operatively associated with each of the said blades for moving them laterally about their respective individual pivotal connections into relatively open positions to form the said wind-driven sustaining-propeller.

5. A device for use with a heavier than air machine comprising, a support pivotally mounted upon the fuselage of the machine for rotation in substantially a horizontal plane; four blades each pivotally secured to the said support at diametrically opposed points thereof for movement laterally in the plane of rotation of the said support; means operatively associated with each of the said blades for moving the blades secured at two of the said diametrically opposed points clockwise about their respective pivotal axis and simultaneously therewith moving the blades secured at the two remaining diametrically opposed points anti-clockwise about their respective pivotal axis into open positions substantially at right angles one with the other to form a wind-driven sustaining propeller; means operatively associated with each of the said blades for moving the blades of the first mentioned two diametrically opposed points anti-clockwise about their respective pivotal axis and simultaneously therewith moving the blades of the said two remaining diametrically opposed points clockwise about their respective pivotal axis into folded pairs longitudinally in alignment one with the other to form a horizontal wing structure simulating the operation of a conventional fixed gliding wing; and means operatively associated with the said blades for retaining the same relatively stationary in their respective folded positions with the folded blades extending longitudinally outwardly and beyond opposite sides of the said fuselage.

6. A device for use with a heavier than air machine comprising a support pivotally mounted upon the fuselage of the machine for rotation in substantially a horizontal plane; a plurality of blades arranged in groups of two each and having the blades of each group individually pivotally secured to the said support at diametrically opposed points thereof for movement laterally in the plane of rotation of the said support; means operatively associated with each of the said blades for simultaneously moving the blades of each group laterally about their respective pivotal axis into open positions longitudinally in alignment one with the other to form a wind-driven sustaining-propeller; means operatively associated with each of the said blades for simultaneously moving the blades of each group laterally about their respective pivotal axis into closed positions to form a horizontal wing structure; and means operatively associated with the said blades for retaining the same relatively stationary in their respective folded positions, with the blades extending longitudinally outwardly and beyond opposite sides of the said fuselage.

7. A device for use with a heavier than air machine comprising, a wind-driven sustaining-propeller consisting of four blades disposed at right angles one to the other and pivotally mounted upon the fuselage of the machine for rotation in substantially a horizontal plane; means operatively associated with the said blades for folding the same into pairs extending outwardly from opposite sides of the said fuselage with the forward edge of the rear blade of each pair abutting the trailing edge of the corresponding forward blade to form a horizontal wing structure simulating the operation of a fixed gliding wing; and means operatively associated with the said blades for moving the same out of their respective folded positions into relative open positions substantially at right angles one to the other to form the said wind-driven sustaining propeller.

8. A device for use with a heavier than air machine comprising, a support rotatably mounted upon the fuselage of the said machine for rotation substantially in a horizontal plane; four blades each pivotally secured to the said support for lateral movement substantially in the plane of rotation thereof; means operatively associated with each of the said blades for moving them laterally into open positions substantially at right angles one with the other to form a wind-driven sustaining-propeller, and for moving the blades laterally into folded pairs longitudinally in alignment one with the other, and with the forward edge of the rear blade of each pair abutting the trailing edge of the corresponding forward blade to form a horizontal wing structure simulating the operation of a fixed gliding wing; and means operatively associated with the said blades for moving them laterally out of their respective folded positions into relative open positions substantially at right angles one to the other to form the said wind-driven sustaining propeller.

GARLAND H. MOURNING.
FRANK H. RICHTERKESSING.